United States Patent
Yao et al.

(10) Patent No.: US 8,055,869 B2
(45) Date of Patent: Nov. 8, 2011

(54) DATA MANIPULATION METHOD OF LOGICAL VOLUME MANAGER

(75) Inventors: Hai-Ting Yao, Tianjin (CN); Tom Chen, Taipei (TW)

(73) Assignee: Inventec Corporation, Taipei (TW)

( * ) Notice: Subject to any disclaimer, the term of this patent is extended or adjusted under 35 U.S.C. 154(b) by 450 days.

(21) Appl. No.: 12/412,133

(22) Filed: Mar. 26, 2009

(65) Prior Publication Data
US 2010/0250879 A1 Sep. 30, 2010

(51) Int. Cl.
*G06F 12/00* (2006.01)
(52) U.S. Cl. .................................................. 711/162
(58) Field of Classification Search .................. None
See application file for complete search history.

(56) References Cited

U.S. PATENT DOCUMENTS
7,840,766 B2 * 11/2010 Eguchi et al. ............... 711/162
* cited by examiner

*Primary Examiner* — Brian Peugh
(74) *Attorney, Agent, or Firm* — Morris Manning Martin LLP; Tim Tingkang Xia, Esq.

(57) ABSTRACT

A data manipulation method of a logical volume manager is applicable to data management of dependent snapshot volumes (SVs) of a logical volume manager. The data management method includes the following steps generating a plurality of SVs, defining the SV generated at first as a first SV, defining the SV generated at last as a last SV, and defining the rest SVs as middle SVs; selecting a middle SV; combining content stored in the selected middle SV into a neighboring SV; according to the combined SV, combining meta-data of the selected middle SV into meta-data of the middle SV; deleting the selected middle SV. The logical volume manager does not need copy the data again, thereby saving access time in data management.

4 Claims, 10 Drawing Sheets

DATA MANIPULATION METHOD OF LOGICAL VOLUME MANAGER

BACKGROUND OF THE INVENTION

1. Field of Invention

The present invention relates to a data manipulation method of a logical volume manager, and more particularly to a deletion manipulation method of a dependent snapshot volume of the logical volume manager.

2. Related Art

In order to store the data in a computer safely and effectively, many data storage techniques were proposed in the past, such as Redundant Array of Independent Disks (RAID) and logical volume manager (LVM). The LVM integrates multiple physical disks, considers the physical disks as a volume group, and partitions several logical volumes (LVs) from the volume group.

The LVM further provides a snapshot volume (SV) method. The snapshot is to provide a corresponding SV adapted to back up the data in real time at a specific time. The SV backs up the overwritten data in the LV instead of backing up all the data in the LV completely.

FIG. 1 shows the process for the data backup of the LV and the SV. Referring to FIG. 1, the process is as follows. Provide an LV (step S110), and the logical volume has a plurality of pieces of data. Add an SV (step S120). Write new data into a cache (step S130). Read the data in the LV before alteration (step S140). Write the data before alteration into the SV (step S150). Write the new data into the LV from the cache (step S160).

The SVs may be categorized into dependent SVs and independent SVs. The dependent SVs require a lower cost to implement (hardware and software) than the independent SVs. Therefore, many logical volume managing systems still employ dependent SVs. FIG. 2 is a schematic structural view of the dependent SVs in the prior art. Referring to FIG. 2, the top of FIG. 2 represents the raw data in an LV. The time axis from the top to the bottom represents the time sequence of creating the SVs. In FIG. 2, a first SV, a second SV and a third SV are created sequentially. When the data in the LV changes for the first time, the first SV is generated. When the data in the LV changes for the second time, the second SV is generated according to the first SV and the newly changed part of the LV. Similarly, when the data in the LV changes for the third time, the third SV is generated.

Because the first SV makes reference to the second SV, and the second SV makes reference to the third SV, when the second SV is to be deleted, an error that the first SV cannot make reference to the second SV occurs. As for the whole logical volume managing system, all of the unnecessary SVs should be deleted completely.

SUMMARY OF THE INVENTION

Accordingly, the present invention is a data manipulation method of a logical volume manager, which is applicable to data management of dependent SVs of the logical volume manager.

In order to achieve the above objective, the data manipulation method of a logical volume manager of the present invention comprises the following steps: generating a plurality of SVs, defining the SV generated at first as a first SV, defining the SV generated at last as a last SV, and defining the rest SVs as middle SVs; selecting a middle SV; combining content stored in the selected middle SV into a neighboring SV; combining meta-data of the selected middle SV into meta-data of the middle SVs according to the combined SV; and deleting the selected middle SV.

The present invention provides the manipulation processing of the dependent SVs, especially the deletion of the dependent SVs. The present invention combines the SV to be deleted with a previous neighboring SV. Thus, the SV subsequent to the SV to be deleted can still make reference to the previous data, and a storage system does not need to copy data, so as to save the access time of the system. Therefore, the dependent SVs can be added or deleted more flexibly.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
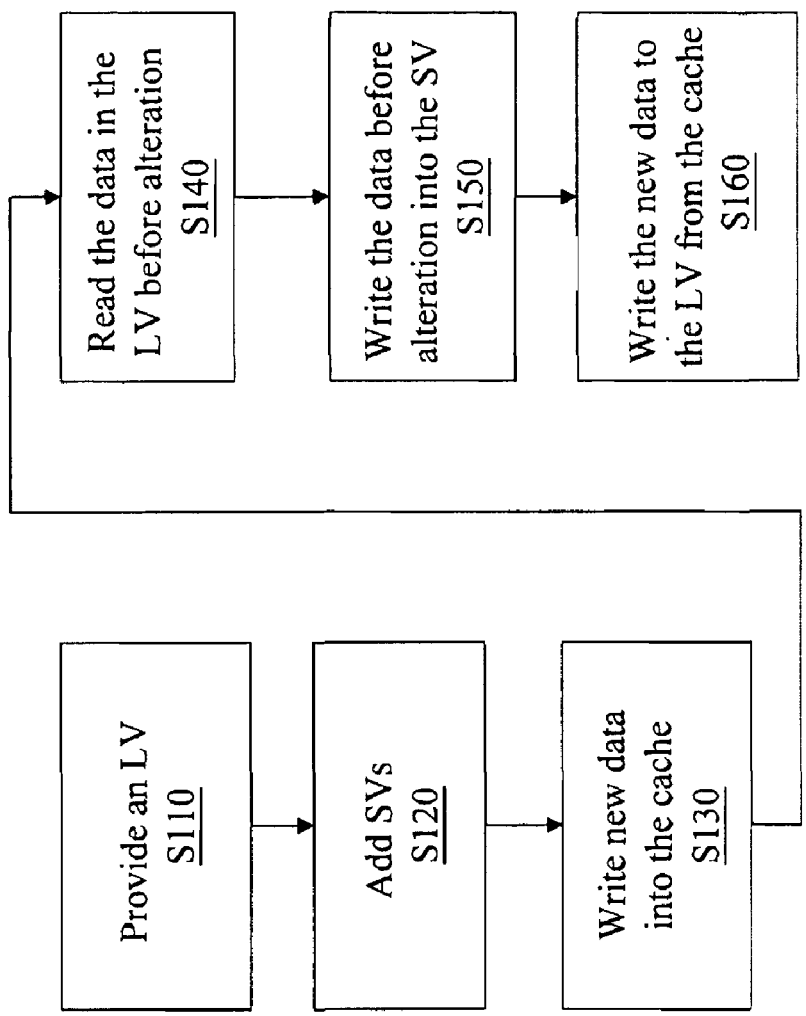
FIG. 1 is a schematic flow chart of the data backup process of the LV and the SV.
Figure 2:
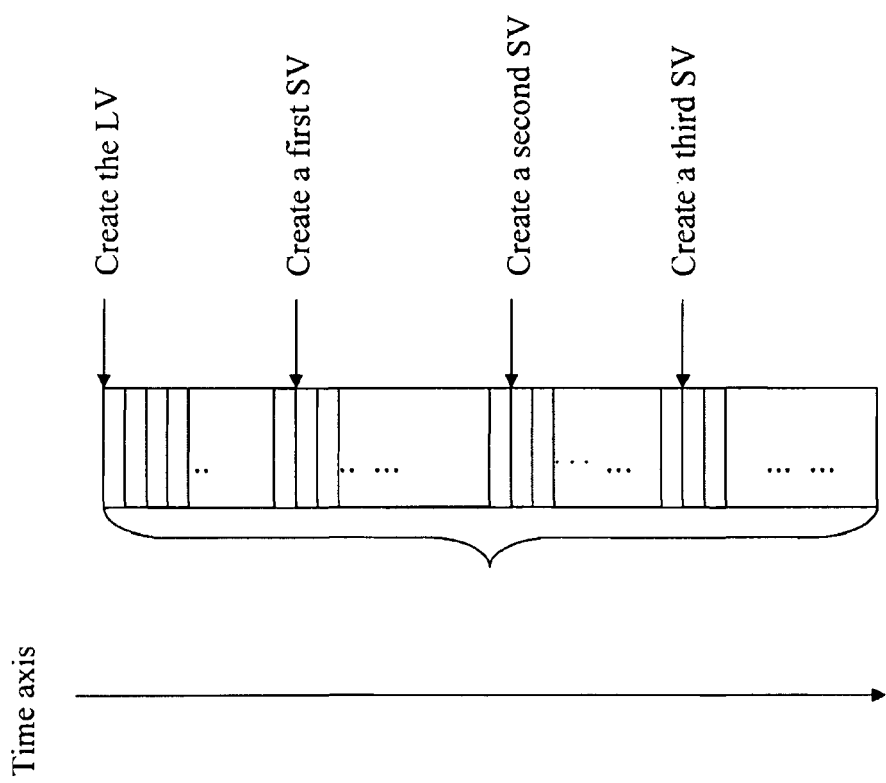
FIG. 2 is a schematic structural view of a dependent SV in the prior art.
Figure 3A:
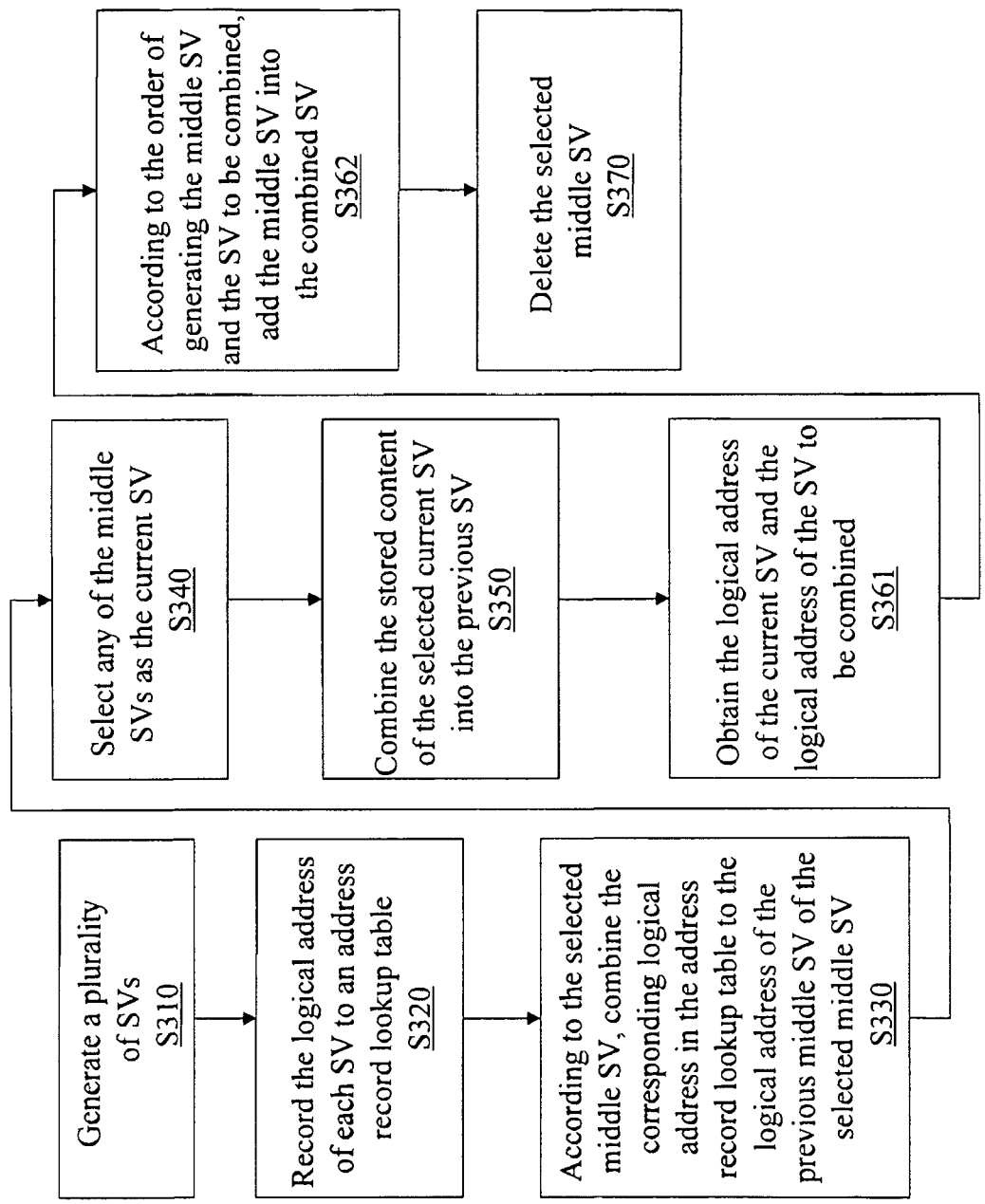
FIG. 3A is a schematic flow chart of the operation of the present invention.

FIG. 3A is a schematic flow chart of the present invention. Referring to FIG. 3, the data manipulation method of the logical volume manager of the present invention comprises the following steps.

Generate a plurality of SVs (step S310), and define the SV generated at first as a first SV, define the SV generated at last as a last SV, and define the rest SVs as middle SVs. The meta-data in each SV records its corresponding starting and ending logical addresses, so as to record the corresponding relationship of a logical block where the SV is located and a logical block where a corresponding source volume of the SV is located. In other words, the logical addresses are records of address correspondence between logical blocks.

Record the logical address of each SV to an address record lookup table (step S320).

Combine the corresponding logical address in the address record lookup table to the logical address of the previous middle SV of the selected middle SV according to the selected middle SV (step S330). The address record lookup table is managed by using a physical entry. In a logical volume management system, the physical entry is used to define the size of a storage block. The logical volume management system does not need to perform additional copy when combining data, because it is only necessary to delete the storage space of the SV and to combine the data stored therein into the previous SV, t.

Select a middle SV (step S340). For the convenience of description, the selected middle SV is defined as the current SV.

Figure 3B:
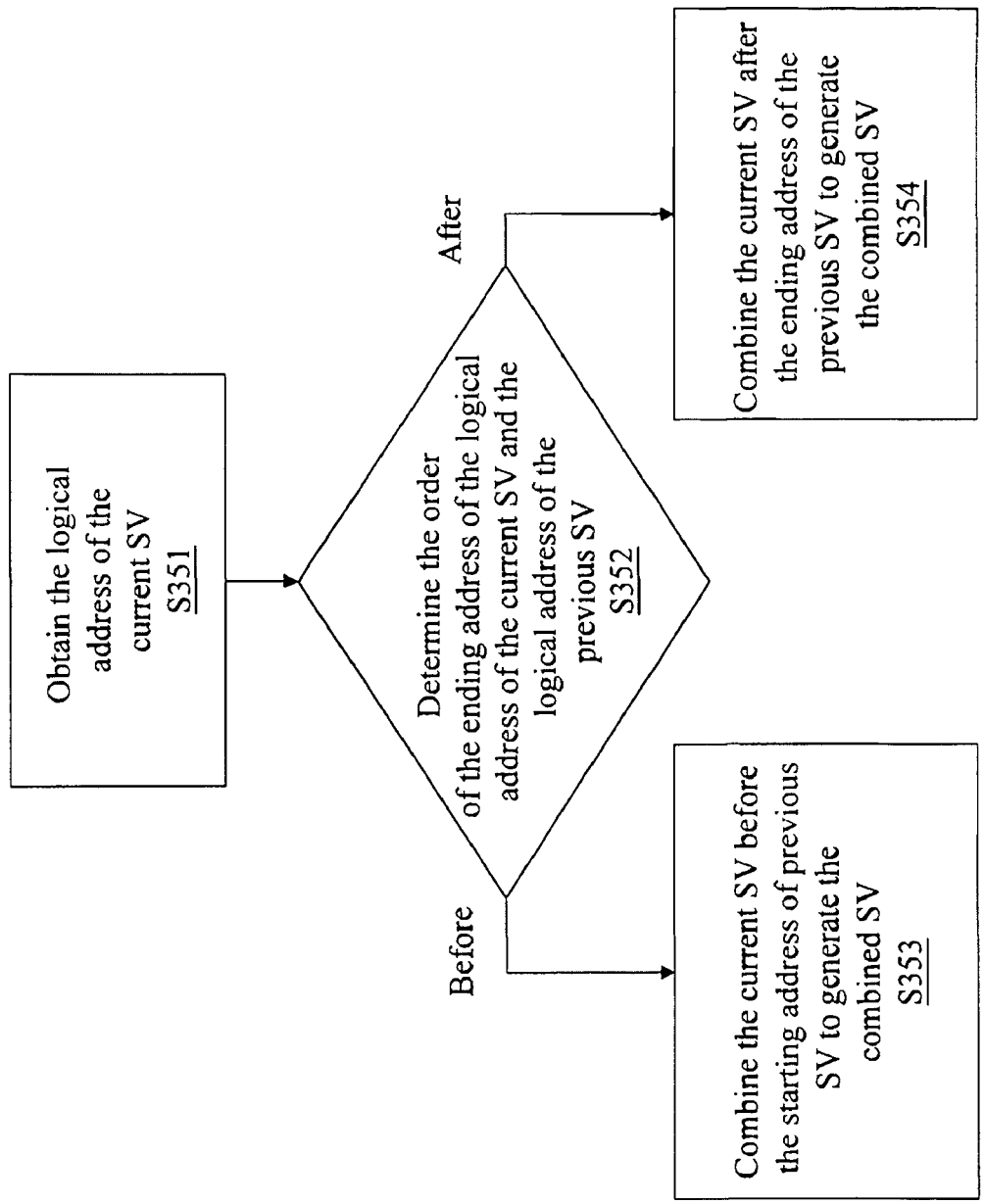
FIG. 3B is a schematic flow chart of the operation of combining the SVs.

Combine the stored content of the selected current SV into the previous SV (step S350). In other words, combine the data stored in the current SV to the previous middle SV of the current SV. The combination of the current SV and the previous SV is performed according to the following steps, as shown in FIG. 3B:

Obtain the logical address of the current SV (step S351).

Determine the order of the ending address of the logical address of the current SV and the logical address of the previous SV (step S352).

If the ending address of the current SV precedes the starting address of the logical address of the previous SV, combine the current SV before the starting address of the previous SV to generate the combined SV (step S353). In other words, combine the SVs according to the order of the current SV and the previous SV, and define the SV after the combination as the combined SV. The storage action only needs to organize the logical addresses, but does not need to copy data, thereby saving the access time of the system.

If the ending address of the current SV follows the ending address of the logical address of the previous SV, then combine the current SV after the ending address of the previous SV, generate the combined SV (step S354). In other words, combine according to the order of the previous SV and the current SV. Define the combined SV as the combined SV, and store the combined data after the logical address of the combined middle SV to start connection. Also, data does not need to be copied, thereby saving the access time of the system.

Combine the meta-data of the current SV into the meta-data in the middle SV according to the combined SV. The process for combining the meta-data of the current SV further comprises the following steps. Obtain the logical address of the current SV and the logical address of the SV to be combined (step S361). Add and combine the middle SV into the combined SV according to the order of generating the middle SV and the SV to be combined (step S362). At last, delete the selected middle SV (step S370).

Figure 4:
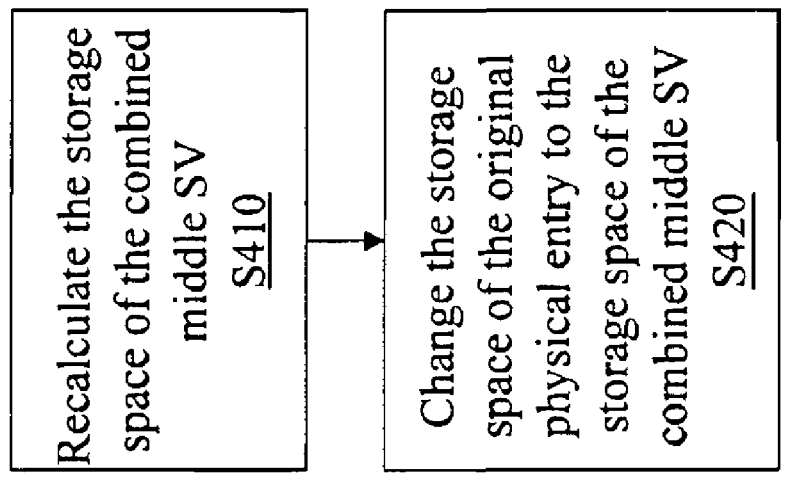
FIG. 4 is a schematic flow chart of deleting the middle SV.
Figure 5A:
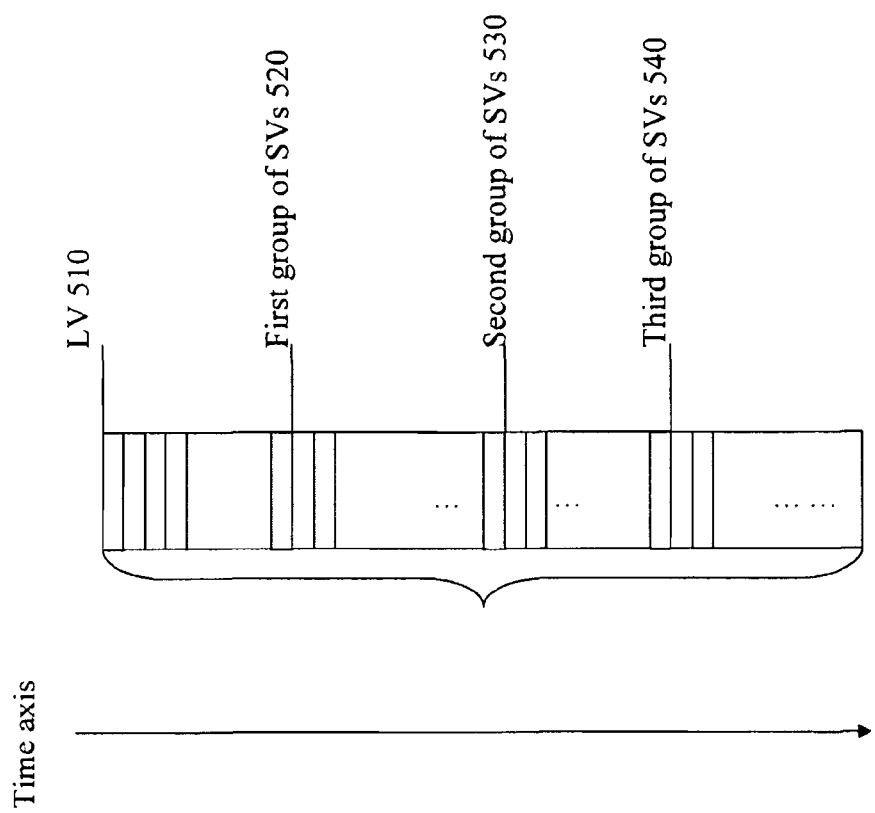
FIG. 5A is a schematic view of an implementation aspect of the present invention.
Figure 5B:
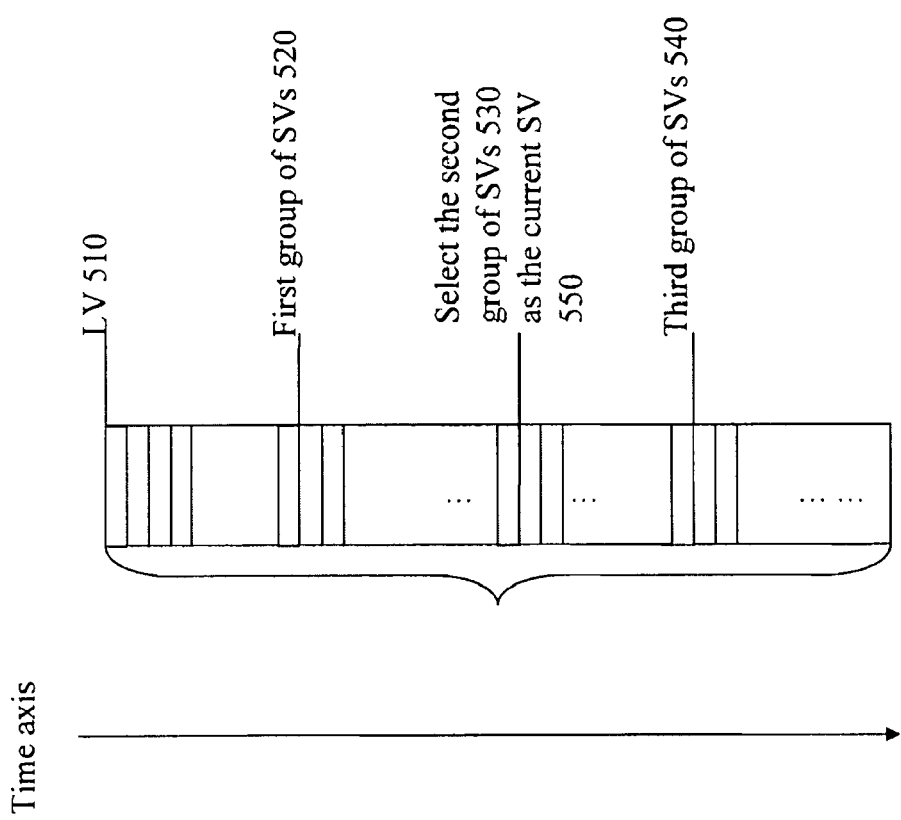
FIG. 5B is a schematic view of an implementation aspect of the present invention.
Figure 5C:
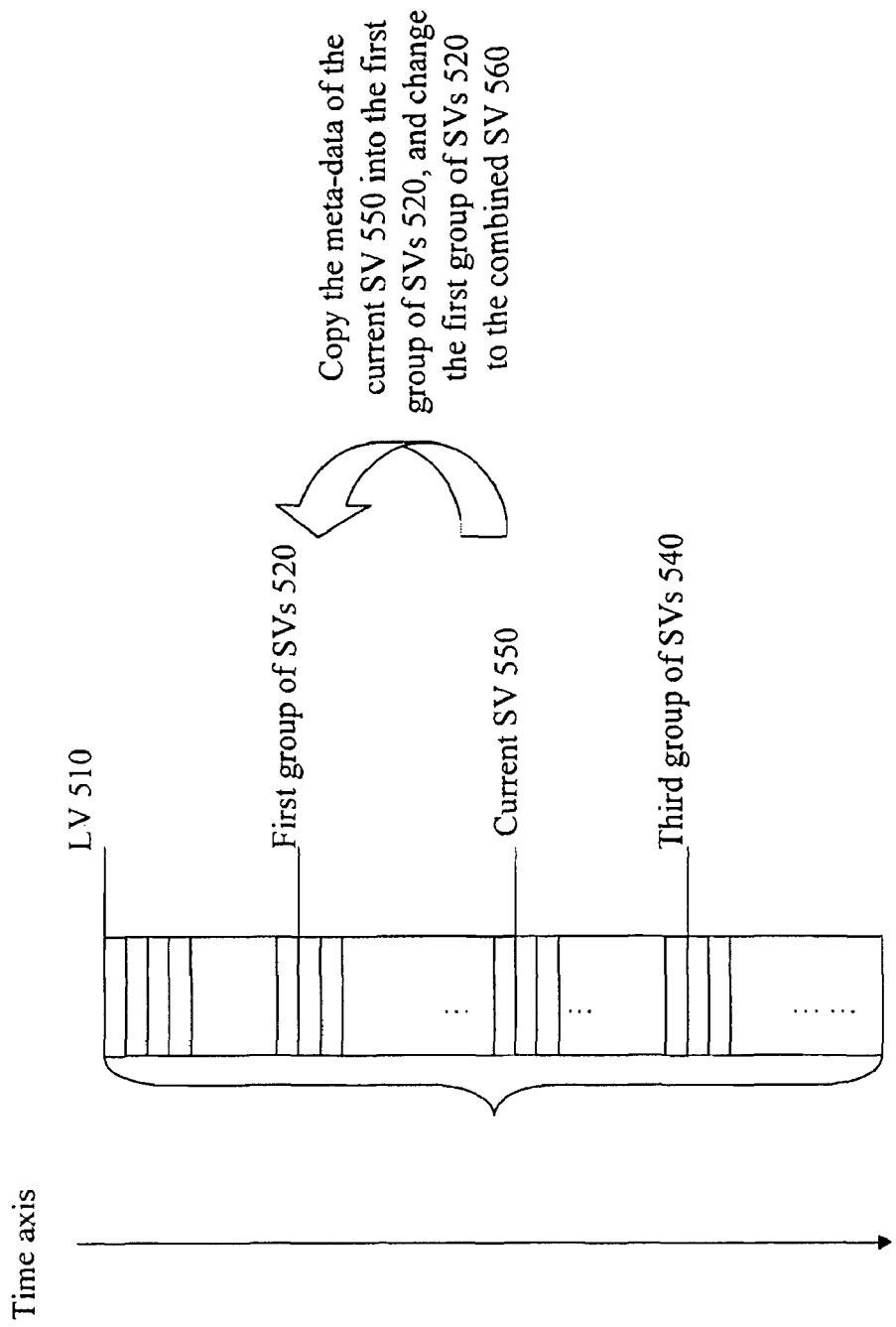
FIG. 5C is a schematic view of an implementation aspect of the present invention.
Figure 5D:
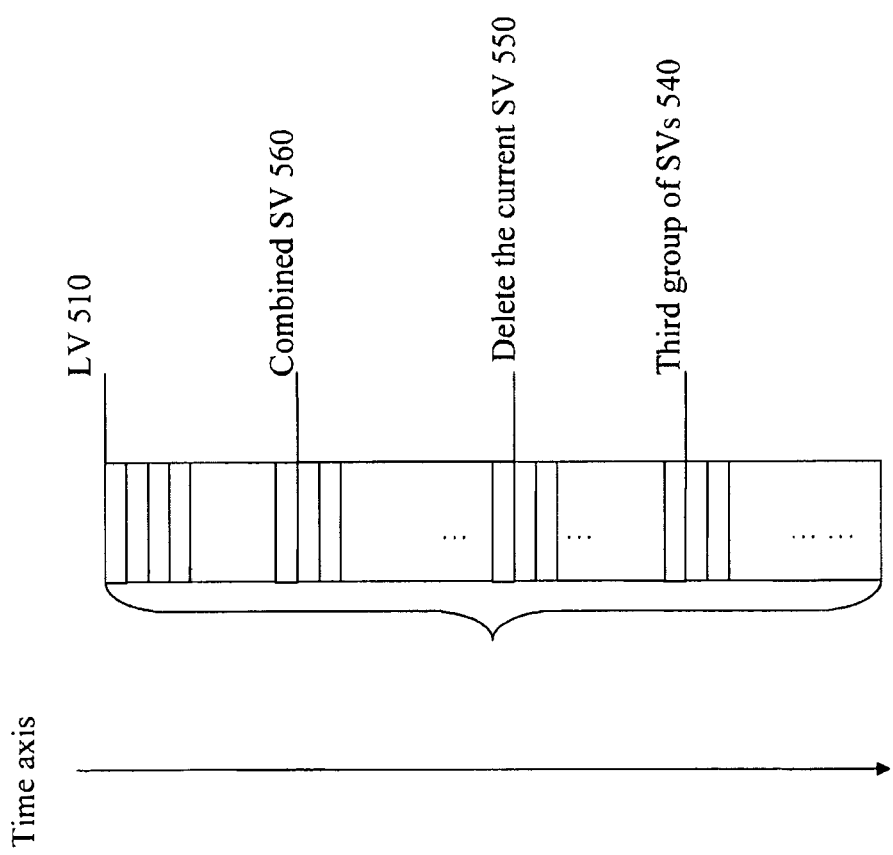
FIG. 5D is a schematic view of an implementation aspect of the present invention.
Figure 5E:
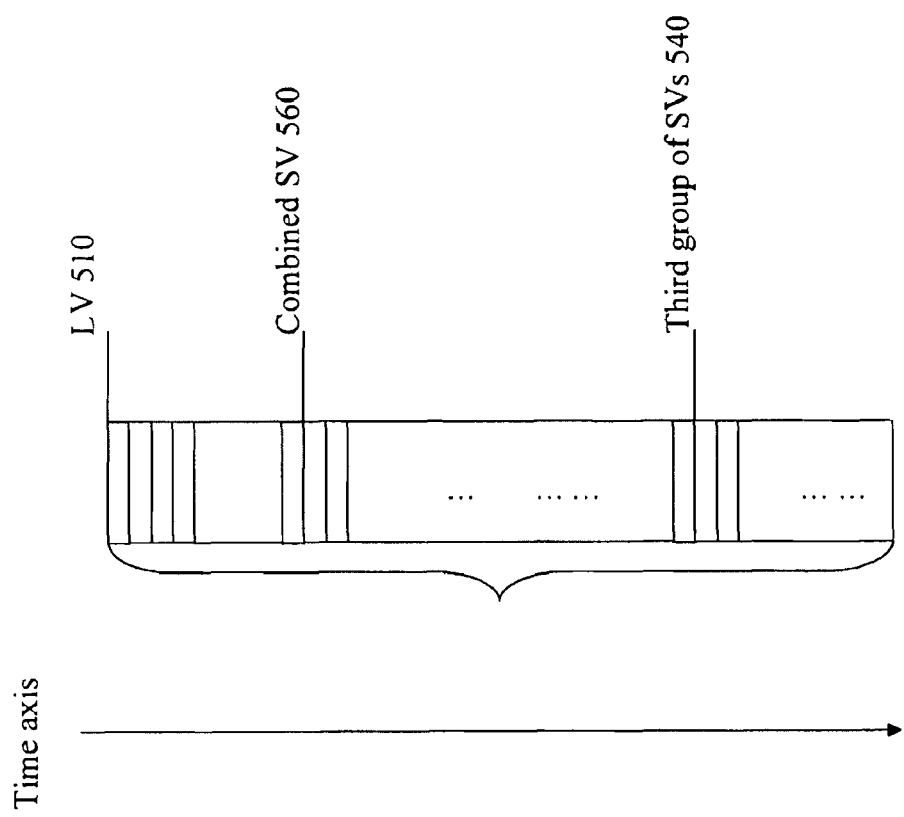
FIG. 5E is a schematic view of an implementation aspect of the present invention.

FIG. 4 is a schematic flow chart of the process for deleting the middle SV. Referring to FIG. 4, after deleting the selected middle SV, perform the following steps on the combined SV. Recalculate the storage space of the combined middle SV (step S410). Change the storage space of the physical entry as the storage space of the combined middle SV (step S420).

The present invention is described with reference to the following. Referring to FIGS. 5A-5E, firstly, the logical volume management system creates a first group of SVs 520 and a second group of SVs 530 respectively. After creating the second group of SVs 530, the data in the 1024$^{th}$ logical block in the LV 510 changes. The logical volume management system creates a third group of SVs 540 according to the changed part of the part. Assume that the 128$^{th}$ logical block in the group of SVs 530 records the changed in the first group of SVs 520. Therefore, if the second group of SVs 530 is deleted (that is, the second group of SVs 530 is set to the current SV 550), the changed data of the first group of SVs 520 cannot be recovered. Therefore, in order to prevent reference failure of the first group of SVs 520 because the current SV 550 is deleted, before deleting the current SV 550, the stored data in the current SV 550 is combined to the first group of SV 520. Assume that the first group of SVs 520 originally uses 512 logical blocks, and the current SV 550 uses 128 logical blocks. After the combination, the first group of SVs 520 stores 640 logical volumes in total. The logical address of the current SV 550 may be processed differently according to the order of combination. If the current SV 550 is combined to the starting part of the file of the first group of SVs 520, the logical address of the current SVs 550 does not need to be recalculated. If the current SV 550 is combined to the end of the file of the first group of SVs 520 (that is, the combined SV 560 is generated), the logical address of the first group of SVs 520 should be recalculated.

The present invention provides a manipulation process of the dependent SVs, especially the deletion of the dependent SVs. The present invention combines the SV to be deleted with the previous neighboring SV. Thus, the SV after the SV to be deleted can still make reference to the previous data, so the data does not need to be copied, thereby saving the access time of the system. Therefore, the dependent SVs can be added or deleted more flexibly.

What is claimed is:

1. A data manipulation method of a logical volume manager, applied to data management of dependent snapshot volumes (SVs) of a logical volume manager, the data management method comprising:

creating a plurality of SVs, defining the SV created at first as a first SV, defining the SV created at last as a last SV, and defining the rest SVs as middle SVs;

selecting any one of the middle SVs as a current SV;

generating a combined SV, combining content stored in the current SV into a neighboring previous SV of the current SV;

combining meta-data of the current SV into meta-data in the combined SV according to the combined SV; and deleting the current SV.

2. The data manipulation method of a logical volume manager according to claim 1, wherein before the selecting the middle SV, the method further comprises:

recording logical addresses of the SVs to an address record lookup table; and combining a logical address corresponding to the selected middle SV in the address record lookup table to a logical address of the previous middle SV of the selected middle SV.

3. The data manipulation method of a logical volume manager according to claim 2, wherein the address record lookup table is managed by using a physical entry.

4. The data manipulation method of a logical volume manager according to claim 1, wherein the combining the meta-data further comprises:

obtaining a logical address of the selected middle SV and a logical address of the SV to be combined; and adding the middle SV to the previous neighboring SV according to an order of generating the middle SV and the SV.

* * * * *